United States Patent [19]

Mueller et al.

[11] Patent Number: 4,988,473

[45] Date of Patent: Jan. 29, 1991

[54] SELF-LATCHING REACTIVITY-REDUCING DEVICE FOR USE IN ON-SITE SPENT FUEL ASSEMBLY STORAGE

[75] Inventors: Donald E. Mueller, Plum Boro; William A. Boyd, Pittsburgh, both of Pa.

[73] Assignee: Westinghouse Electric Corp., Pittsburgh, Pa.

[21] Appl. No.: 466,521

[22] Filed: Jan. 17, 1990

Related U.S. Application Data

[62] Division of Ser. No. 281,148, Dec. 8, 1988, Pat. No. 4,917,856.

[51] Int. Cl.⁵ .............................................. G21C 7/06
[52] U.S. Cl. ..................................... 376/327; 376/364
[58] Field of Search ............... 376/447, 272, 327, 235, 376/440, 364

[56] References Cited

U.S. PATENT DOCUMENTS

| | | | |
|---|---|---|---|
| 3,377,252 | 4/1968 | Knights | 376/327 |
| 3,382,153 | 5/1968 | Bigge et al. | 376/447 |
| 3,527,670 | 9/1970 | Winders | 376/327 |
| 3,867,253 | 2/1975 | Gratton et al. | 376/364 |
| 4,010,375 | 3/1977 | Wachter et al. | 250/507 |
| 4,039,842 | 8/1977 | Mollon | 250/518 |
| 4,044,267 | 8/1977 | Bevilacqua | 250/518 |
| 4,096,392 | 6/1978 | Rubinstein et al. | 250/507 |
| 4,143,276 | 3/1979 | Mollon | 250/507 |
| 4,152,206 | 5/1979 | Jabsen | 376/440 |
| 4,166,313 | 9/1979 | Walton | 29/243.5 |
| 4,203,038 | 5/1980 | Tarahashi et al. | 250/507 |
| 4,243,889 | 1/1981 | Weber | 250/507 |
| 4,268,357 | 5/1981 | Formanek et al. | 376/364 |
| 4,304,631 | 12/1981 | Walton et al. | 376/327 |
| 4,382,060 | 5/1983 | Holtz et al. | 376/272 |
| 4,391,771 | 7/1983 | Anthony | 376/440 |
| 4,609,524 | 9/1986 | Ferrari | 376/327 |
| 4,684,498 | 8/1987 | Paul | 376/446 |
| 4,684,499 | 4/1987 | Gjertsen et al. | 376/446 |
| 4,687,631 | 8/1987 | Wilson et al. | 376/446 |
| 4,738,023 | 4/1988 | Fabris | 29/723 |
| 4,748,908 | 6/1988 | Feezor et al. | 376/272 |
| 4,753,769 | 6/1988 | Savary | 376/235 |
| 4,803,042 | 2/1989 | Gilmore et al. | 376/272 |

FOREIGN PATENT DOCUMENTS

| | | |
|---|---|---|
| 0061043 | 11/1982 | European Pat. Off. . |
| 0189718 | 3/1986 | European Pat. Off. . |
| 3008489 | 9/1981 | Fed. Rep. of Germany ...... 376/364 |
| 3238297 | 4/1984 | Fed. Rep. of Germany ...... 376/446 |
| 2544541 | 10/1984 | France . |
| 0197807 | 7/1978 | Japan .................................. 376/327 |
| 0100389 | 9/1978 | Japan .................................. 376/440 |
| 0053796 | 4/1979 | Japan .................................. 376/235 |
| 62-76498 | 4/1987 | Japan . |
| 1159971 | 7/1969 | United Kingdom ................ 376/364 |

*Primary Examiner*—Harvey E. Behrend

[57] ABSTRACT

A self-latching reactivity-reducing device contains neutron absorbing material and is installable in a guide thimble of a spent fuel assembly for reducing the reactivity of the assembly to allow its storage in an on-site fuel storage facility. The device includes an elongated rod which contains the neutron absorbing material and has a central passage extending between opposite ends of the rod. A self-latching mechanism is disposed on a leading end of the rod and engagable with a lower end portion of the guide thimble upon full insertion of the rod in the guide thimble so as to render the self-latching mechansim unlatchable from the guide thimble without the use of an independent tool inserted solely through the rod passage from a trailing end thereof. A closure plug is removably fastened to the trailing end of the rod for closing the passage therethrough. The self-latching mechanism includes a plurality of latch members being mounted for pivotal movement between displaced latching and releasing positions at the leading end of the rod and biased toward the latching position.

6 Claims, 6 Drawing Sheets

SELF-LATCHING REACTIVITY-REDUCING DEVICE FOR USE IN ON-SITE SPENT FUEL ASSEMBLY STORAGE

This is a division of application Ser. No. 07/271,148 filed Dec. 8, 1988, now U.S. Pat. No. 4,917,856, issued Apr. 17, 1990.

BACKGROUND OF THE INVENTION

1. Field of the Invention

The present invention relates generally to spent fuel storage and, more particularly, is concerned with a self-latching reactivity-reducing device for allowing placement of a spent fuel assembly in a fuel storage facility.

2. Description of the Prior Art

In a typical nuclear reactor, the reactor core includes a large number of fuel assemblies each of which is composed of top and bottom nozzles with a plurality of elongated transversely spaced guide thimbles extending longitudinally between the nozzles and a plurality of transverse support grids axially spaced along the guide thimbles. Also, each fuel assembly is composed of a plurality of elongated fuel elements or rods transversely spaced apart from one another and from the guide thimbles and supported by the transverse grids between the top and bottom nozzles. The fuel rods each contain fissile material and are grouped together in an array which is organized so as to provide a neutron flux in the core sufficient to support a high rate of nuclear fission and thus the release of a large amount of energy in the form of heat. A liquid coolant is pumped upwardly through the core in order to extract some of the heat generated in the core for the production of useful work.

At the end of their useful life, spent fuel assemblies are removed from the reactor core and replaced with fresh fuel assemblies. Because of the lack of any permanent off-site spent fuel disposal facility at the present time, nuclear power plant utilities are forced to store all spent fuel assemblies in pools at on-site fuel storage facilities. However, these on-site storage facilities were originally designed to hold only a fraction of the fuel used over the operating life of the plant. Spent fuel storage pool reactivity, K-eff, is limited in most nuclear plants by technical specifications to being less than 0.95. These technical specifications thus limit the ability to increase the number of spent fuel assemblies which can be stored on-site.

The spent fuel pool reactivity limit is also at odds with modern nuclear fuel management strategies. Most utilities are increasing the U-235 enrichments of the fuel that is used. This increase allows the utilities to reduce the total number of fuel assemblies they need to buy and store.

There exist several options to increasing storage capability or fuel enrichment limits. These options range from very expensive reracking operations to a criticality safety reanalysis. One of the most effective methods available today is called "burnup credit" analysis. In this form of criticality safety analysis, calculations are performed to show that a fuel assembly can be safely stored after it has accumulated a minimum amount of burnup. The minimum amount of burnup is dependent on the initial U-235 enrichment of the assembly in question. At high enrichments the burnup requirement may be very large. The burnup requirement is often large enough to preclude the storage of a significant number of fuel assemblies.

Each of the problems described above could be overcome by reducing the reactivity of the fuel assemblies to be stored. One technique is to insert neutron absorber or poison rods into the spent fuel assembly to reduce the reactivity of the fuel assembly so that it can be stored in the on-site fuel storage facility. Representative of this technique is the approach disclosed in European Pat. application No. 0,061,043 to Kuhnel et al and French Pat. application No. 2,544,541 to Foussard. Each of these publications discloses the use of a device attachable to the top nozzle of the spent fuel assembly for locking a cluster of poison rods against removal in the fuel assembly.

One drawback of the locking devices disclosed in the cited publications stems from their reliance upon the exercise of some human effort in rendering them effective, and from their relatively easy accessibility at the top of the fuel assembly. If it is too easy to unlock or unfasten the devices and remove the cluster of poison rods, then these arrangements might be considered as removable under current regulatory standards. The current regulatory standards do not allow credit to be taken for removable neutron absorbers. Thus, simply putting conventional neutron absorber or poison rods into a spent fuel assembly and locking them in the fuel assembly at its top nozzle may not be sufficient to meet current standards.

Consequently, a need exists for an improved approach to lowering reactivity in a spend fuel assembly so as to permit its placement in an on-site fuel storage facility.

SUMMARY OF THE INVENTION

The present invention provides a self-latching reactivity-reducing device designed to satisfy the aforementioned needs. Several of these devices placed in guide thimbles of a spent fuel assembly greatly reduce the nuclear reactivity of the fuel assembly. This would allow spent nuclear fuel to be stored in spent fuel storage racks that would otherwise be too reactive.

The reactivity-reducing device of the present invention is insertable fully in a guide thimble of the spent fuel assembly and incorporates self-latching means which is effective, upon full insertion of the device, to automatically render the device non-removable without the use of an independent tool. The self-latching means is located at a region along the device adjacent the lower end of the fuel assembly where it is inaccessible from the top of the fuel assembly and thus unlatchable without the assistance of the independent tool.

Accordingly, the present invention is directed to a reactivity-reducing device for insertion in a guide thimble of a spent nuclear fuel assembly. The reactivity-reducing device comprises: (a) an elongated rod having leading and trailing ends and containing neutron absorber material, the rod being insertable in the guide thimble to place its trailing end adjacent an upper end portion of the guide thimble and its leading end adjacent a lower end portion of the guide thimble; and (b) means mounted at the leading end of the rod for self-latching with the lower end portion of the guide thimble upon completion of insertion of the rod into the guide thimble and being unlatchable from the guide thimble without the use of an independent tool. Further, the rod has a central passage defined therein extending between and open at least at the trailing end thereof, the passage providing the only way for reaching the self-latching means by the independent tool for unlatching the same. The reactivity-reducing device also includes means removably attached to the trailing end of the rod for closing the passage therethrough and rendering the self-latching means at the leading end of the rod inaccessible by the independent tool from the trailing end of the rod such that the rod is non-removably installed in the guide thimble.

More particularly, the self-latching means includes a plurality of latch members mounted for pivotal movement between displaced latching and releasing positions at the leading end of the rod, and a plurality of actuating levers respectively attached to the latch members and engagable by the independent tool when inserted through the passage for moving the levers and thereby the latch members from their latching to releasing positions once the closing means has been removed from the rod trailing end. Also, the self-latching means includes means coupled between the latch members and the leading end of the rod for biasing the latch members toward their latching positions.

Also, the rod has a tubular portion and a head portion attached to the tubular portion at the trailing end of the rod. The tubular portion has a diameter smaller than the inside diameter of the guide thimble and the head portion has a diameter larger than the inside diameter of the guide thimble such that the head portion seats on the top nozzle for suspending the tubular portion within the guide thimble when the rod is installed in the guide thimble. Further, the head portion has means defined thereon for cooperating with an independent remover for gripping the head portion to withdrawal the rod from the guide thimble once the self-latching means has been unlatched from the guide thimble. These and other features and advantages of the present invention will become apparent to those skilled in the art upon a reading of the following detailed description when taken in conjunction with the drawings.

BRIEF DESCRIPTION OF THE DRAWINGS

In the course of the following detailed description, reference will be made to the attached drawings in which:

FIG. 6 is a view combining the views of FIGS. 2 and 3 to show the reactivity-reducing device inserted in the guide thimble of the fuel assembly and its lower self-latching means in a latching position.

DETAILED DESCRIPTION OF THE INVENTION

Figure 1:
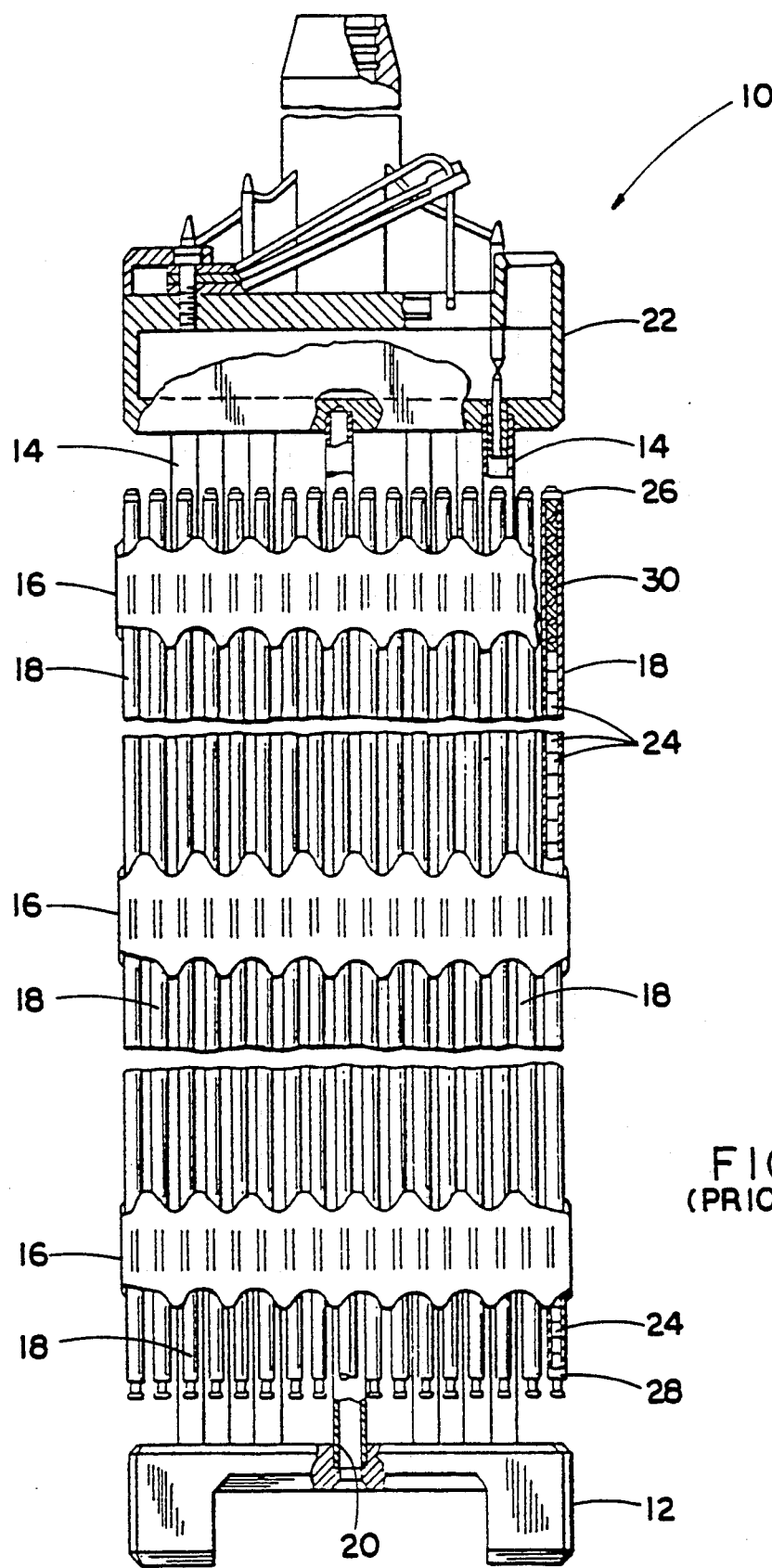
FIG. 1 is an elevational view, partly in section, of a prior art fuel assembly being illustrated in vertically foreshortened form with parts broken away for clarity.

In the following description, like reference characters designate like or corresponding parts throughout the several views of the drawings. Also in the following description, it is to be understood that such terms as "forward", "rearward", "left", "right", "upwardly", "downwardly", and the like are words of convenience and are not to be construed as limiting terms.

Referring now to the drawings, and particularly to FIG. 1, there is shown an elevational view of a prior art fuel assembly, represented in vertically foreshortened form and being generally designated by the numeral 10. The fuel assembly 10 is the type used in a pressurized water reactor (PWR) and basically includes a lower end structure or bottom nozzle 12 for supporting the assembly on the lower core plate (not shown) in the core region of a reactor (not shown), and a number of longitudinally extending guide tubes or thimbles 14 which project upwardly from the bottom nozzle 12. The assembly 10 further includes a plurality of transverse grids 16 axially spaced along the guide thimbles 14 and an organized array of elongated fuel rods 18 transversely spaced and supported by the grids 16. Also, the assembly 10 has an instrumentation tube 20 located in the center thereof and an upper end structure or top nozzle 22 attached to the upper ends of the guide thimbles 14. With such an arrangement of parts, the fuel assembly 10 forms an integral unit capable of being conventionally handled without damaging the assembly parts.

As mentioned above, the fuel rods 18 in the array thereof in the fuel assembly 10 are held in spaced relationship with one another by the grids 16 spaced along the fuel assembly length. Each fuel rod 18 includes nuclear fuel pellets 24 and the opposite ends of the rod are closed by upper and lower end plugs 26,28 to hermetically seal the rod. Commonly, a plenum spring 30 is disposed between the upper end plug 26 and the pellets 24 to maintain the pellets in a tight, stacked relationship within the rod 18. The fuel pellets 24 composed of fissile material are responsible for creating the reactive power of the PWR. A liquid moderator/coolant such as water, or water containing boron, is pumped upwardly through the fuel assemblies of the core in order to extract some of the heat generated therein for the production of useful work.

Self-Latching Reactivity-Reducing Poison Device

Figure 2:
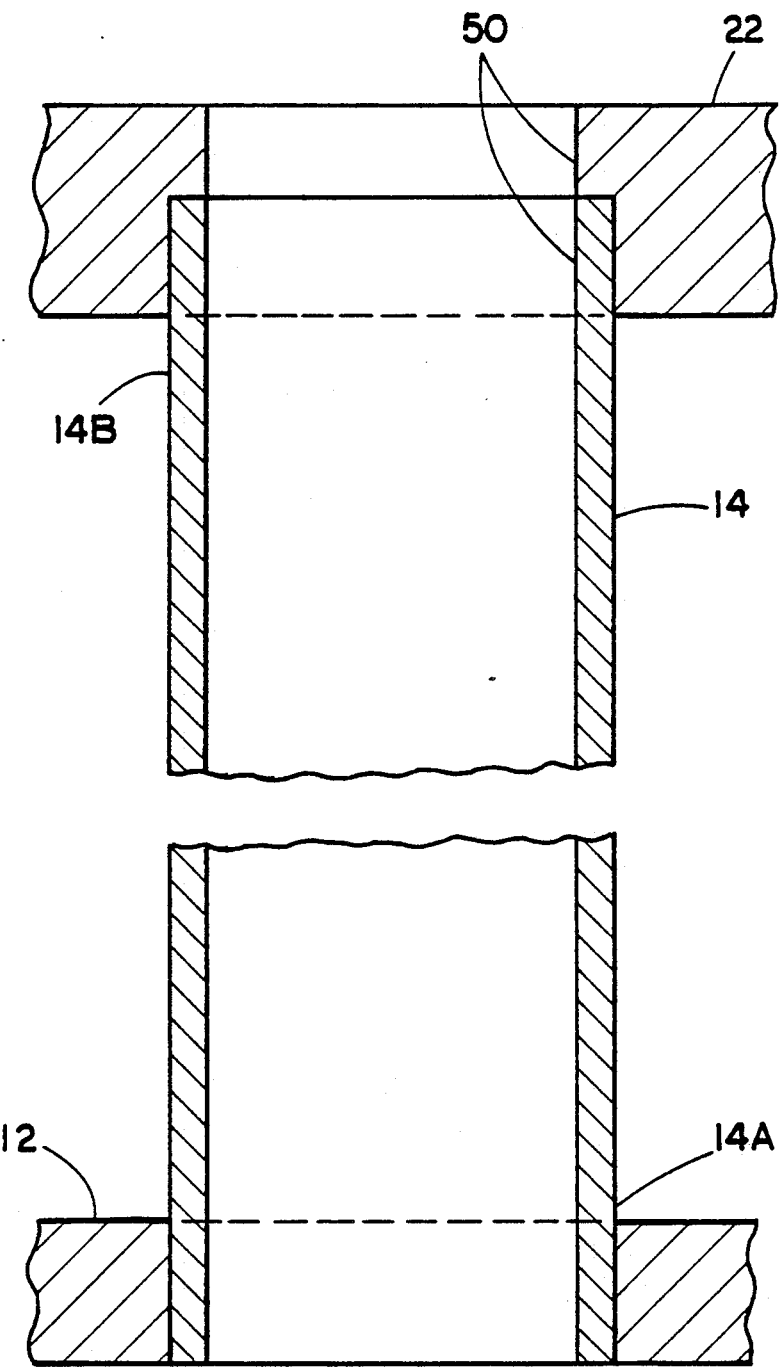
FIG. 2 is an enlarged fragmentary longitudinal sectional view in vertically foreshortened form of one guide thimble and the top and bottom nozzle of the fuel assembly of FIG. 1.
Figure 3:
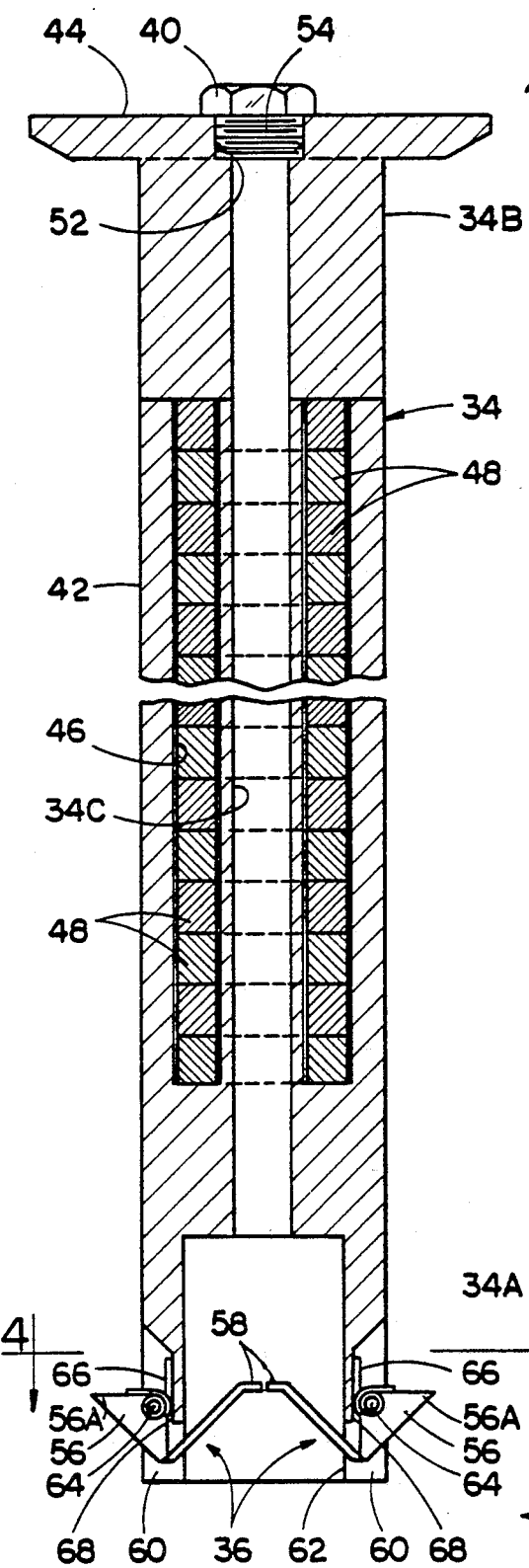
FIG. 3 is an enlarged longitudinal sectional view in vertically foreshortened form of one reactivity-reducing device of the present invention.
Figure 4:
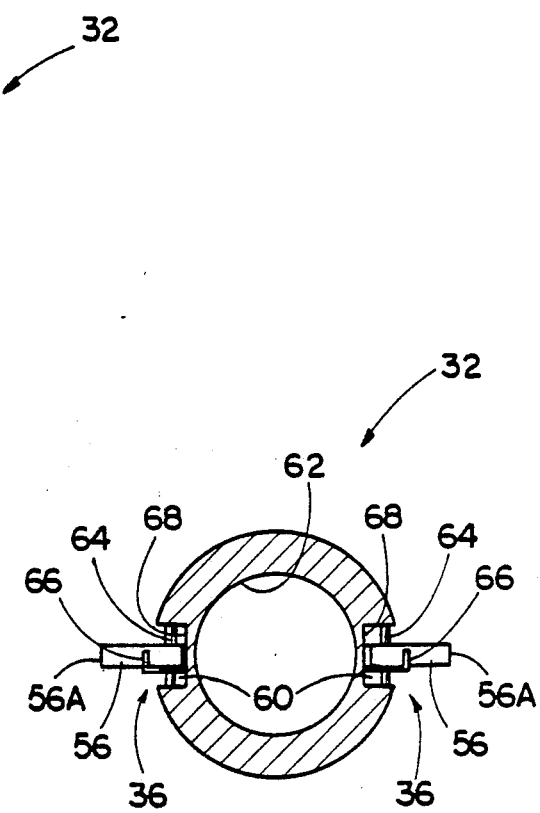
FIG. 4 is a cross-sectional view taken along line 4—4 of FIG. 3.
Figure 5:
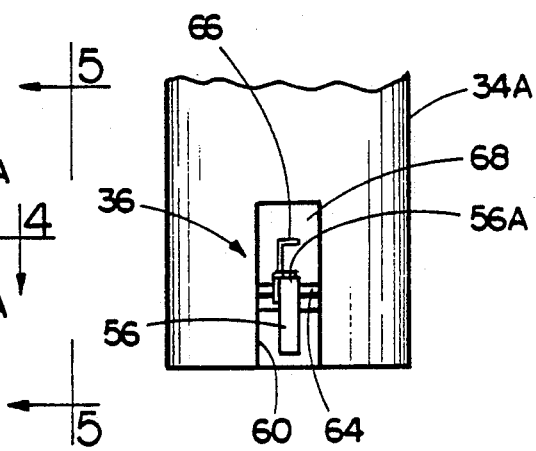
FIG. 5 is an elevational view as seen along line 5—5 of FIG. 4.
Figure 7:
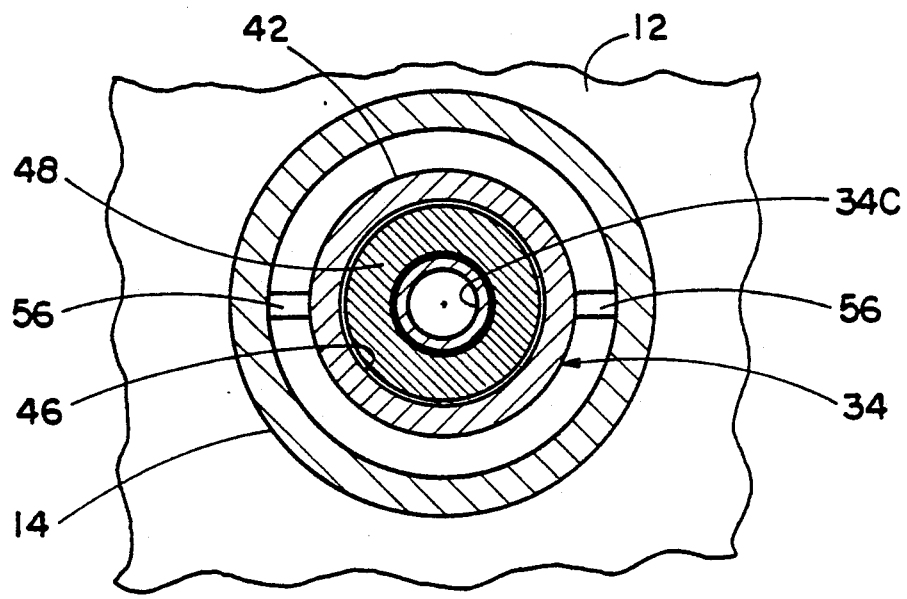
FIG. 7 is a cross-sectional view taken along line 7—7 of FIG. 6.

Turning now to FIGS. 3-5, there is illustrated a self-latching reactivity-reducing device, generally designated by the numeral 32 and constructed in accordance with the present invention. The reactivity-reducing device 32 is adapted for insertion into one of the guide thimbles 14 of the fuel assembly 10, shown diagrammatically in FIG. 2, to provide the device 32 in the installed relationship with the guide thimble 14, as shown in FIG. 6.

In its basic components, the reactivity-reducing device 32 includes an elongated rod 34 having leading and trailing ends 34A, 34B and a central passage 34C extending between and open at the ends, and a self-latching mechanism 36 mounted at the leading end 34A of the rod 34. Upon full insertion of the rod 34 in the guide thimble 14, the self-latching mechanism 36 automatically latches with the lower end portion 14A of the guide thimble 14 and is thereby rendered unlatchable from the guide thimble 14 without the use of an independent elongated shaft-like tool 38 (FIG. 9) inserted solely through the central passage 34C of the rod 34 from the trailing end 34B thereof. Also, the device 32 includes a closure plug 40 mounted at the trailing end 34B of the rod for closing off access to the passage 34C and thereby to the self-latching mechanism 36 by the tool 38, rendering the rod 34 non-removably installed in the guide thimble 14.

More particularly, the elongated rod 34 of the reactivity-reducing device 32 includes a generally cylindrical tubular portion 42 and an upper head portion 44 attached to the tubular portion 42 at the trailing end 34B of the rod. The tubular portion 42 has an interior annular chamber 46 defined therein which contains a burnable poison or neutron absorbing material in the form of a stack of annular pellets 48. The outside diameter of the tubular portion 42 is smaller than the inside diameter of the guide thimble 14 allowing insertion of the rod tubular portion therein. Preferably, when the tubular portion 42 of the rod 34 is fully inserted in the guide thimble 14, the rod trailing end 34B is disposed adjacent to the top nozzle 22 and the guide thimble upper end portion 14B and the rod leading end 34A is disposed adjacent to the bottom nozzle 12 and the guide thimble lower end portion 14A.

Figure 9:
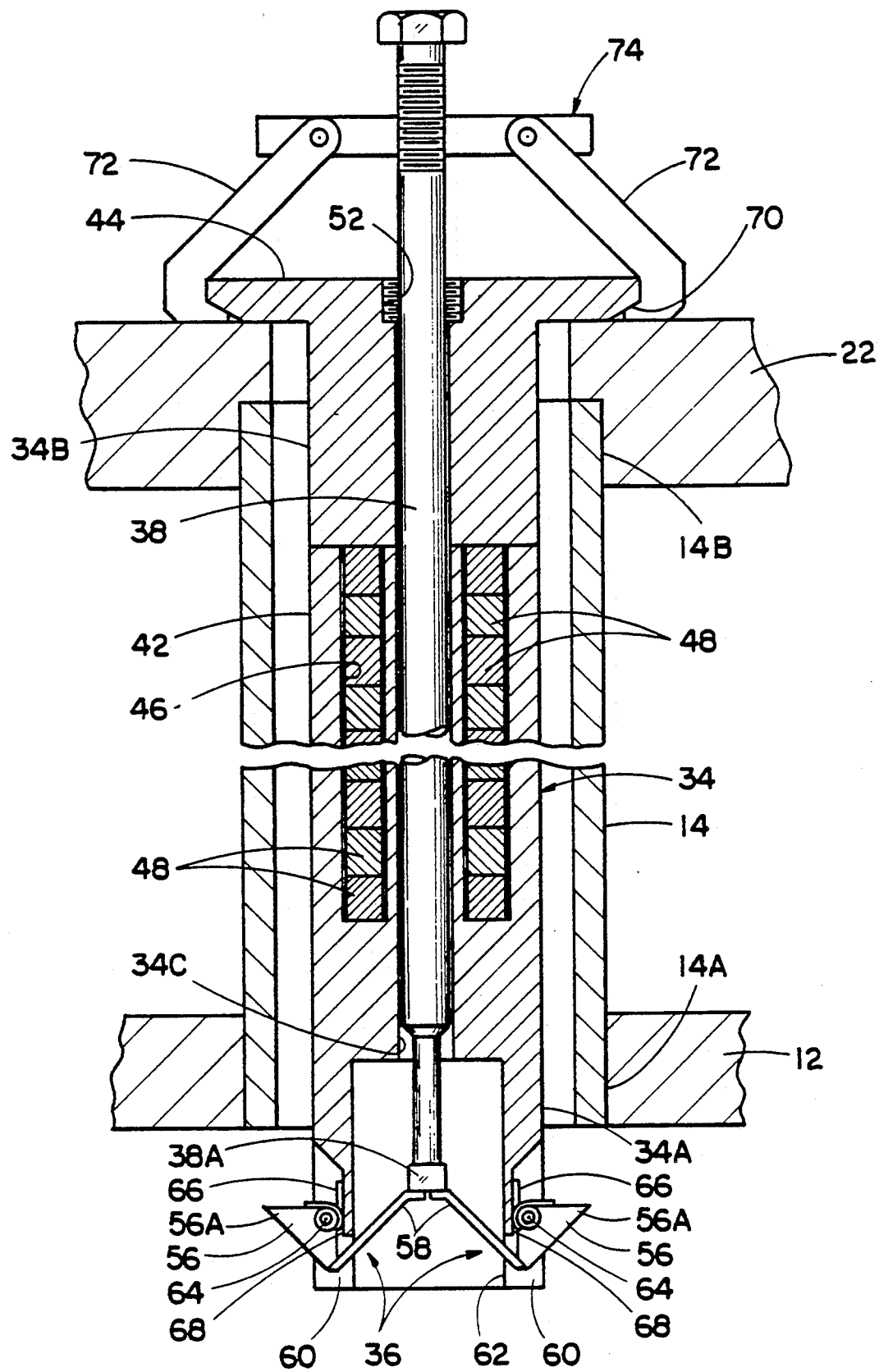
FIG. 9 is a view similar to that of FIG. 6, but illustrating a removal mechanism for use in withdrawing the reactivity-reducing device from the guide thimble of the fuel assembly.
Figure 9:
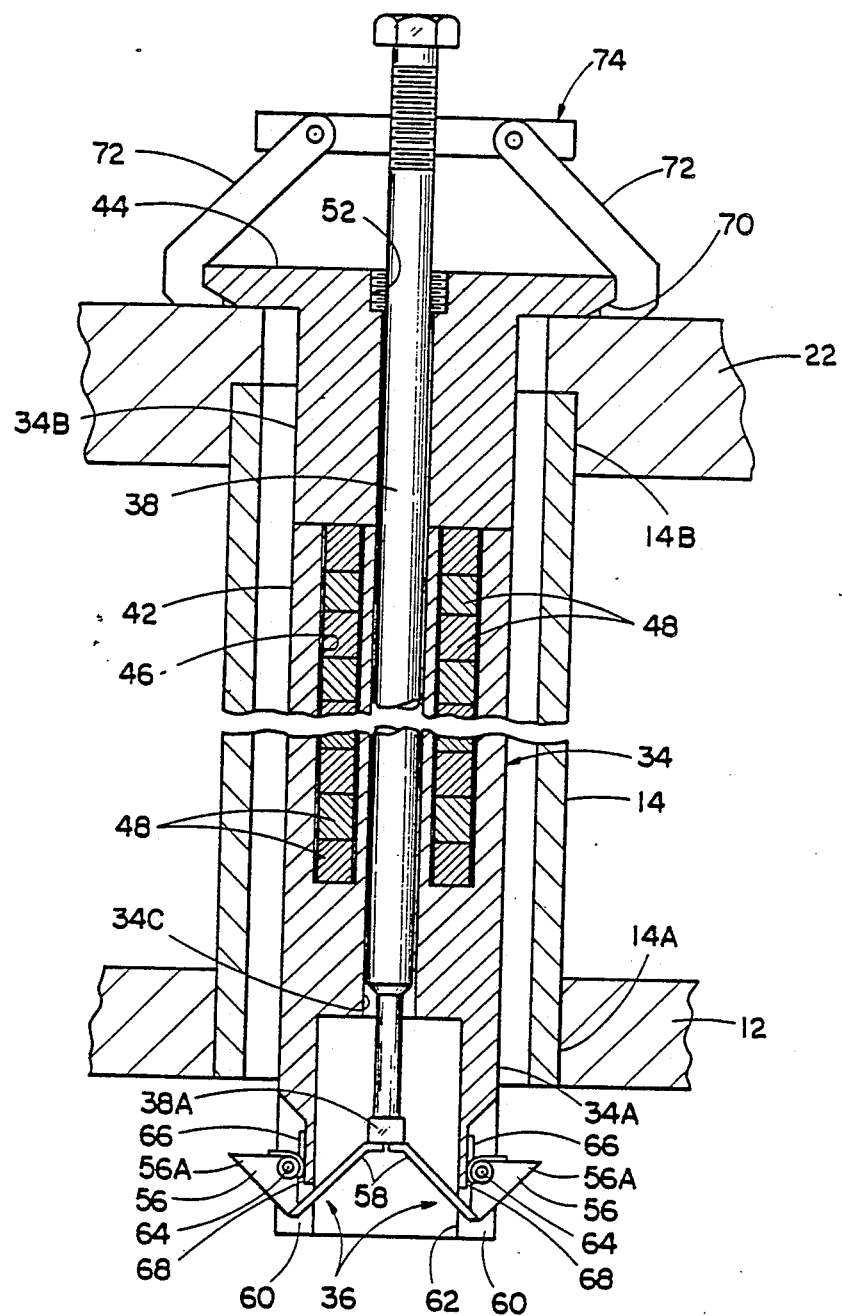

The upper head portion 44 of the rod 34 is a circular plate having an outside diameter larger than the inside diameter of the guide thimble 14 such that head portion 44, as seen in FIGS. 6 and 9, seats on an annular edge portion of the top nozzle 22 surrounding an opening 50 defined through the top nozzle and in which the upper end portion 14B of the guide thimble 14 is inserted. The head portion 44 of the rod 34 thus serves to suspend or support its tubular portion 42 in the guide thimble 14. The passage 34C extends centrally through the tubular portion 42 and upper head portion 44. The upper end of the passage 34C at the head portion 44 has internal threads 52 which mate with the external threads 54 on the closure plug 40 of the device 32.

As seen in one exemplary embodiment of FIGS. 3-5, the self-latching mechanism 36 includes a pair of triangular-shaped latch members 56 and a pair of actuating levers 58 respectively attached to and extending inwardly of the latch members 56. The latch members 56 are disposed through a pair of opposing side slots 60 defined in the leading end 34A of the tubular portion 42 of the rod 34 such that the levers 58 extend from the latch members 56 into an enlarged diameter recess 62 in the rod leading end 34A which communicates with the central passage 34C and the slots 60. It should be understood that more than a pair of latch members 56, actuating levers 58 and slots 60 can be employed.

As best seen in FIG. 5, the latch members 56 are pivotally mounted by pivot pins 64 which are mounted to the tubular portion 42 and extend across the respective slots 60, as best seen in FIG. 5. The latch members 56 are pivotally movable between displaced latching and releasing positions, as seen respectively in FIGS. 6 and 8. Biasing means in the form of twisted wire-like springs 66 encircle the pivot pins 64 and at their opposite ends engage edges on the latch members 56 and the ledges 68 in the slots 60 of the tubular portion 42 for biasing the latch members 56 toward their latching positions, as seen in FIGS. 3 and 6, and in abutment with the ledges 68. In such position, the tips 56A of the latch members 56 extend radially outward beyond the lower end portion 14A of the guide thimble 14 so as to prevent withdraw of the latch members 56 upwardly through the guide thimble 14.

Figure 8:
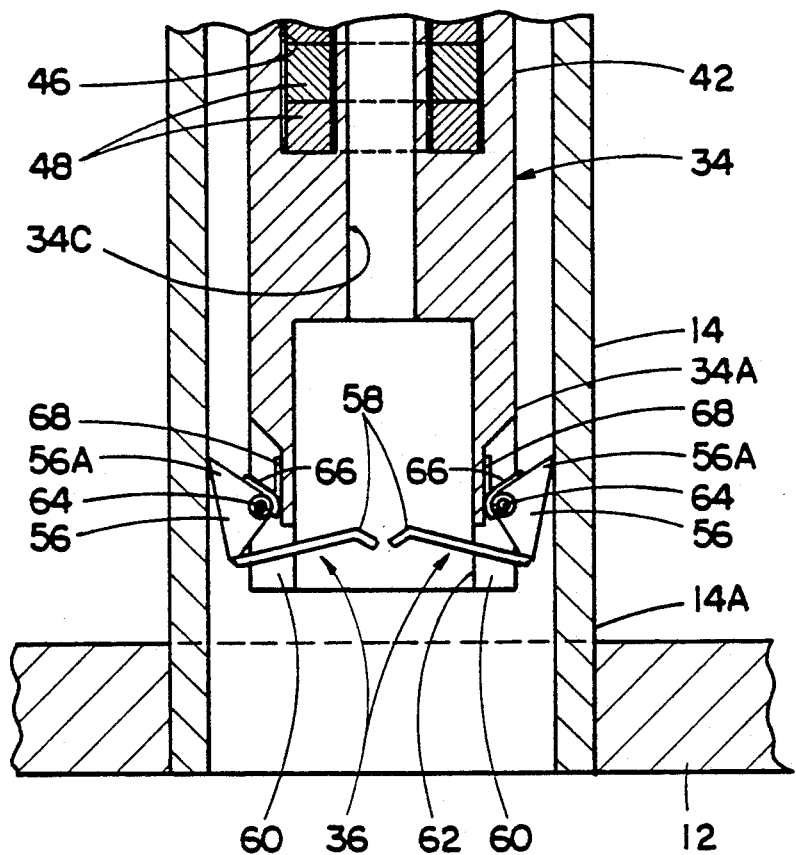
FIG. 8 is a fragmentary longitudinal sectional view of the lower portions of the guide thimble and reactivity-reducing device similar to that seen in FIG. 6, but showing the self-latching means in an unlatching position while the device is being either inserted into or withdrawn from the guide thimble.

In order to withdraw the device 32, the actuating levers 58 must be moved in a downward direction to pivot the latch members 56 upwardly and inwardly against their biases to the releasing position of FIG. 8. Such movement of the levers 58 is accomplished by insertion of the elongated tool 38 down through the passage 34C to bring its leading end 38A into engagement with the levers 58.

To insert the tool 38, the closure plug 40 must first be unthreaded and removed. Thus, several steps must be taken in order to unlatch the self-latching mechanism. For that reason, without the assistance of the tool 38, the device 32 can be characterized as non-removable from the guide thimble 14. As shown in FIG. 9, the upper head portion 44 of the rod 34 has an undercut or beveled lower peripheral edge 70 for cooperating with gripping arms 72 on an independent remover 74 for gripping the head portion 44 to permit withdrawal of the device 32 from the guide thimble 14 once the self-latching mechanism 36 has been unlatched from the guide thimble by the elongated tool 38. An annular ring (not shown) can be placed over the arms 72 to prevent them from spreading radially outward and releasing their hold on the upper head portion 44 of the device 32.

To recapitulate, it is believed that the Nuclear Regulatory Commission (NRC) would consider the reactivity-reducing device 32 having such construction to be non-removable because several things must be done, involving separate independent tools, to remove it. Once installed and latched, the device 32 cannot fall out. The construction of the device 32 is rugged enough that even if the fuel assembly is damaged the device will remain in place.

The reactivity-reducing device 32 will reduce fuel assembly reactivity enough so that fuel with enrichments greater by as much as 3.0 w/o than the current limit could be stored. Or they could be used to decrease the minimum burnup required for burnup credit by as much as 30,000 MWD/MTU.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. An arrangement for reducing the reactivity of a spent nuclear fuel assembly to permit placement thereof in a fuel storage facility, said arrangement comprising:
   (a) an elongated tool;
   (b) a reactivity-reducing device including
      (i) an elongated rod being separate from said tool and insertable in a guide thimble of a spent fuel assembly, said rod having leading and trailing ends and containing neutron absorbing material,
      (ii) latch means mounted to said leading end of said rod of movement between an outwardly displaced latching position and an inwardly displaced releasing position, and (iii) means engaged with said latch means for biasing said latch means to said latching position such that said means is not movable from said latching position to said releasing position without the use of said elongated tool, (iv) said rod having a central passage opening at said trailing end of said rod and extending from said trailing end to said latch means at said leading end of said rod, said central passage from said trailing end of said rod providing the only way for reaching said latch means by said elongated tool for moving said latch means from said latching position to said releasing position; and (c) means separate from said elongated tool and said reactivity-reducing device and being detachably attachable to said trailing end of said rod for closing said passage therethrough and rendering said latch means at said opposite leading end of said rod inaccessible by said elongated tool from said trailing end of said rod such that said latch means remains at said latching position, said elongated tool being insertable through said passage of said rod upon detaching of said closing means from said rod for engaging and moving said latch means against said biasing means from said latching position to said releasing position.

2. The arrangement as recited in claim 1, wherein said latch means includes a plurality of latch members being mounted for pivotal movement between displaced latching and releasing positions at the leading end of said rod.

3. The arrangement as recited in claim 2, wherein said means also includes a plurality of actuating levers respectively attached to said latch members and engageable by said elongated tool when inserted through said passage for moving said levers and thereby said latch members from their latching to releasing positions once said closing means has been detached from said rod trailing end.

4. The arrangement as recited in claim 1, wherein said closing means is a closure plug threadably attached to said trailing end of said rod.

5. The arrangement as recited in claim 1, wherein said rod has a tubular portion of a diameter smaller than an inside diameter of a guide thimble for permitting insertion of said tubular portion therein and a head portion attached to said tubular portion at said trailing end of said rod and of a diameter larger than the inside diameter of the guide thimble such that said head portion is capable of suspending said tubular portion in the guide thimble when said rod is inserted therein.

6. The arrangement as recited in claim 5, wherein said head portion has means defined thereon for cooperating with an independent remover for gripping said head portion to withdrawal said rod from the guide thimble once said self-latching means have been unlatched from the guide thimble.

* * * * *